Dec. 31, 1940. O. STAM 2,226,879
ILLUMINATING DEVICE
Filed Oct. 10, 1938 3 Sheets-Sheet 1
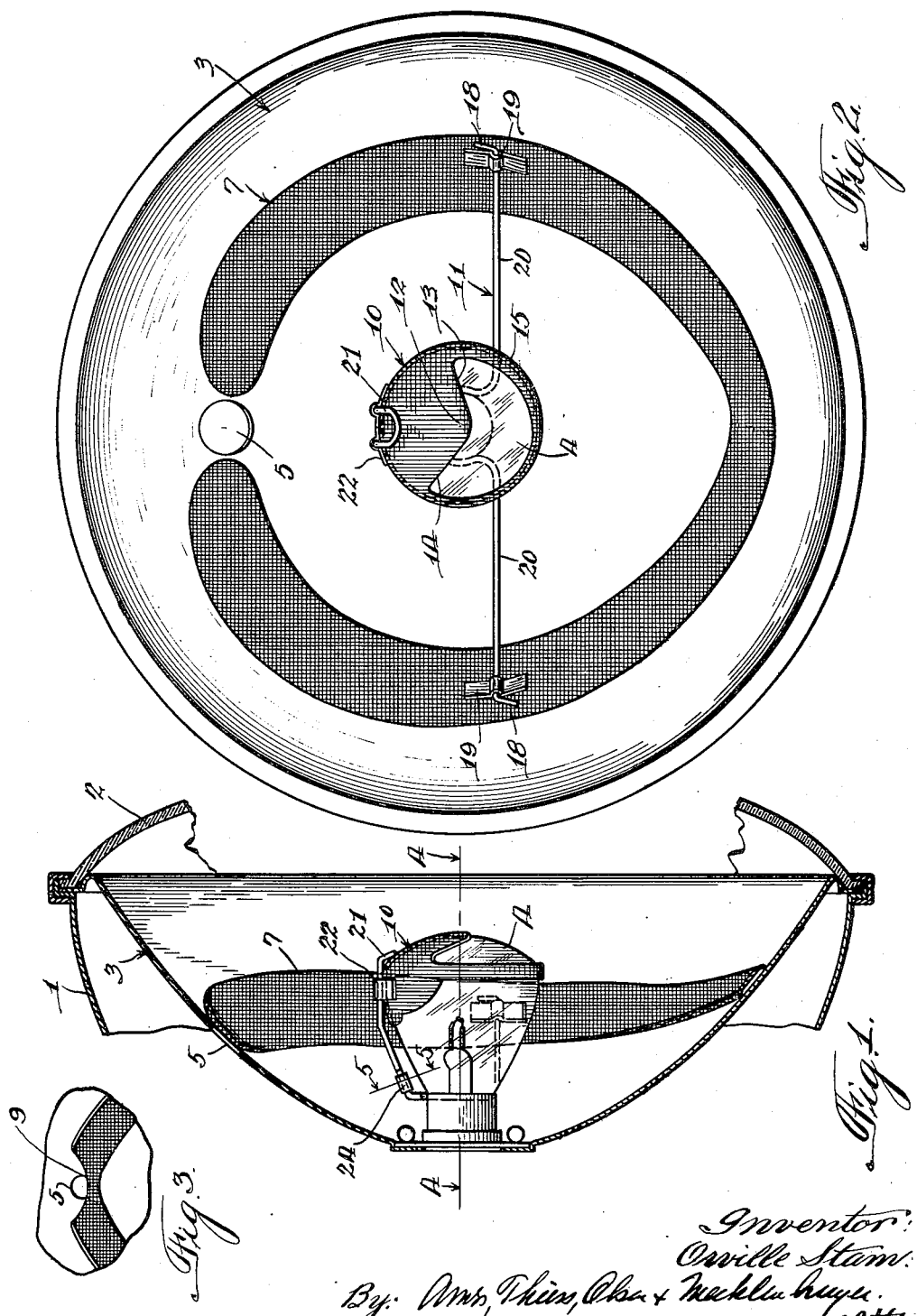
Inventor:
Orville Stam
By Anns, Thiess, Olson & Macklenburger
Attys

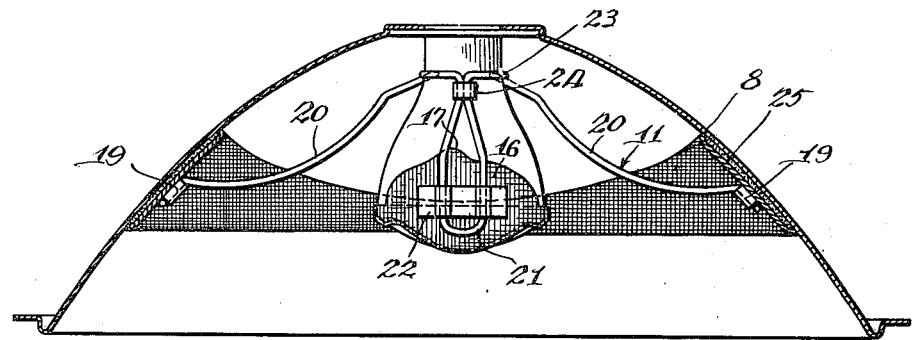
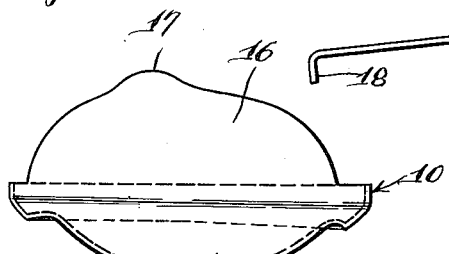
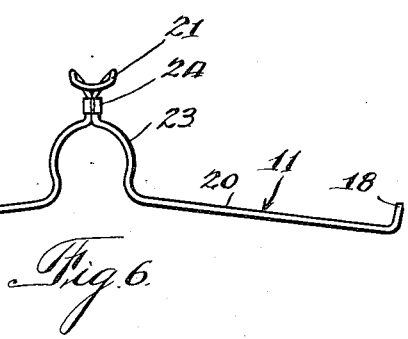
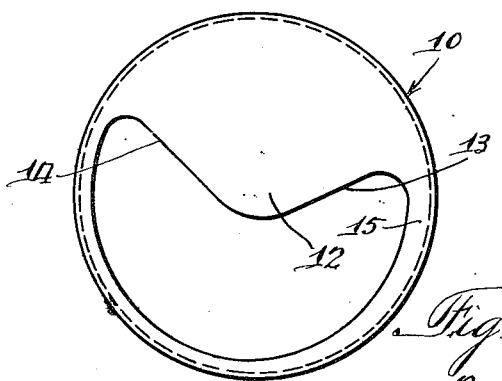
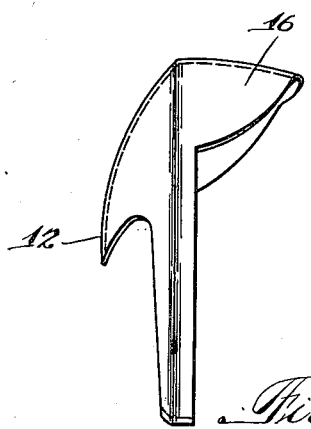

Dec. 31, 1940.　　　　O. STAM　　　　2,226,879

ILLUMINATING DEVICE

Filed Oct. 10, 1938　　　3 Sheets-Sheet 3

Inventor
Orville Stam

Patented Dec. 31, 1940

2,226,879

UNITED STATES PATENT OFFICE 2,226,879

ILLUMINATING DEVICE

Orville Stam, Chicago, Ill., assignor to Stam-O-Lite, Inc., Chicago, Ill., a corporation of Illinois Application October 10, 1938, Serial No. 234,140

17 Claims. (Cl. 240—48.2)

This invention relates to illuminating devices and more particularly to an improvement in automobile headlights and similar beam projectors and attachments therefor whereby the projected beam and light pattern may accurately be controlled and glare may be eliminated, particularly from the viewpoint of passing automobiles and from the eyes of pedestrians, while at the same time providing effective road and shoulder illumination. The invention also contemplates a new and novel attachment for headlights whereby filament images in all or any part of the illuminated field may be eliminated or reduced to such an extent as is desirable for all practical purposes.

This application is a continuation in part of my prior application Serial No. 174,090, filed November 11, 1937.

An important object is the provision of improvements in so-called fog lights or headlights adaptable for such use whereby the beam may be controlled and patterned in such a manner that light rays, either diffused or otherwise, are not projected in a manner to be reflected back into the eyes of the driver from the particles of moisture in the air, thereby materially increasing visibility in fog, rain, snow, or dust, without the necessity for increasing illumination.

A further object is the production of a suitable glare eliminating headlight which does not necessitate any material change in the headlights now in use and in which the present cost of headlights will not materially be increased.

So-called glare in automobile headlights is caused by converging rays forming filament images in space. Brilliant filament images cause corneal reflex in the eyes of the observer. The pupil of the eye is contracted and the muscles of the eye are sometimes temporarily paralyzed to such an extent that anything approaching normal vision is impossible. Even after the eye is out of the range of the glare, normal vision is not restored for an appreciable period of time.

It is, therefore, an object of the present invention to eliminate the converging rays which cause brilliant filament images. It has been found that, with a substantially perfect parabolic reflector with the usual filament light source of material dimensions in the focal region, the so-called glare zone or source from which filament images are projected has mathematically defined boundary lines and comprises a comparatively narrow, substantially ring-like zone substantially in the focal plane of the reflector. There will be no disturbing filament images projected from outside this zone if the reflecting surface of the reflector is not distorted from a true paraboloidal curve.

The invention selectively eliminates filament images or reduces the sharpness of the filament coil imagery which would otherwise be a component of the beam as a consequence of the fact that the filament is not a point light source. This amounts to reducing the apparent size of the filament coil, or, in other words, it makes the usual large filament coil project a beam more nearly like that from a point source, especially with respect to finite convergently focused content of the beam.

It is, therefore, an object of the present invention to provide a headlight in which at least a substantial portion of the area within the well defined glare zone is constructed and arranged to make the light rays impinging thereon from the light source ineffective to project disturbing glare images.

The present invention provides a glare eliminating headlight in which the normal intensity of the light beam is not materially diminshed, particularly in those areas in which effective illumination is desirable to meet safety requirements; also in which visibility is materially increased throughout the illuminated field without the necessity for increasing candle power of the light source. Furthermore, the candle power may, if desired, be greatly increased without loss of control of glare and without loss of advantages gained by such control.

A further object is the production of a glare eliminating and light pattern controlling headlight in which the light aberrations caused by inequalities or structural requirements in the glass envelope of the bulb are effectively eliminated or controlled in combination with the control of aberration at the reflector glare zone, so that these combined controls co-operate to provide clear vision for the driver under all conditions, as well as eliminating filament images in the illuminated field.

A further object is to provide a glare eliminating attachment for the usual automobile headlights which may easily be attached without the use of auxiliary fastening devices and which may be so designed as substantially to eliminate glare from the eyes of the passing motorists without diminishing the light source intensity while at the same time increasing, or at least not reducing, visibility from the viewpoint of the driver. It has been found by careful test and extended use that the invention materially increases visibility under all weather conditions, including fog and rain.

In the specification and claims the focal plane of the reflector has, for convenience, been used as a base or reference plane to approximately determine the position of the glare zone. The location and limits of the zone may, however, accurately be determined mathematically for any given reflector or may be found by actual test, and this test may be accomplished by means of a so-called glarograph which has been developed in the laboratories of the applicant and which will be referred to in detail later. The glarograph is a device for accurately charting the glare zone of any reflector by filament image projection. The device will form the subject matter of another application but will be described herein to illustrate an accurate method of determining and plotting the glare zone area of any reflector or, in fact, any reflecting surface. The glarograph effectively demonstrates that the instant invention corrects for glare not only outside the substantially collimated main beam but also within the main beam. The location and area of the zone to be corrected to accomplish this result may accurately be determined and plotted.

An important object of the invention is to provide substantially daylight perspective. This is accomplished by eliminating light streaks and cores, particularly at intermediate distances, and enables the driver to see farther and correctly judge distances.

The present invention greatly improves visibility for the operator of a vehicle equipped therewith. The ability to see depends upon the contrast of the object being observed as against the surroundings. If this contrast becomes extreme the eyes become easily fatigued. That is, sharp extreme contrasts in the field may considerably lower the visual acuity. Furthermore, the eye unconsciously seeks out the brighter portion of a field of vision to the detriment of less brilliant parts of the field. A field of view in which there are very intense illuminated areas would lead one to see these intense areas to the detriment of the surroundings. Therefore, a headlamp beam which has a pattern with very great localized intensity may actually reduce seeing. This region of light intensity may be very intense and so reduce seeing but may still contain only a small portion of the total usable light—hence the proper elimination of this region of high intensity would increase visibility. By eliminating the small zone of high intensity, this invention makes available a larger zone of seeing. In short, seeing is improved because harsh contrasts are avoided within the useful field. That this point of high intensity exists at relatively great distances with a commercial headlight has been proved by exhaustive tests. It is, therefore, an object of this invention to improve visibility for the operator by eliminating from the light beam a major portion of the light rays which normally cause peak intensity in the beam pattern, and without otherwise materially interfering with normal beam projection.

A further object is the provision of a device of the character described which will be cheap to manufacture, easy to assemble and install, and which will not easily get out of order.

Further objects will be apparent from the specification and the appended claims.

In the drawings:

Fig. 1 is an axial sectional view in a vertical plane through a headlight with the lens and casing broken away and illustrates one embodiment of the invention.

Fig. 2 is a front view of the embodiment illustrated in Fig. 1.

Fig. 3 is a fragmentary detail view of a slightly modified form of the upper part of the zone attachment.

Fig. 4 is a transverse sectional view through the embodiment illustrated in Figs. 1 and 2 and taken on a line substantially corresponding to line 4—4 of Fig. 1 with portions shown in full lines for purposes of illustration.

Fig. 5 is a detail sectional view through the wire supporting clip and is taken on a line substantially corresponding to line 5—5 of Fig. 1.

Fig. 6 is a detail front view of the resilient supporting clip.

Fig. 7 is a top view of the bulb cap.

Fig. 8 is a front elevation of the bulb cap as illustrated in Fig. 7.

Fig. 9 is a side view of the cap as illustrated in Fig. 8.

Figure 10:
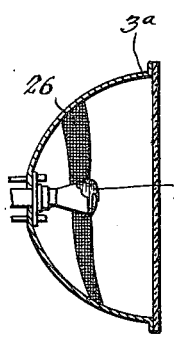
Fig. 10 is a longitudinal axial section through a headlight reflector and lens and illustrates another embodiment of the invention in which the glare eliminating and pattern correcting features form integral parts of the headlight and bulb.

Referring to the drawings in detail, the embodiment illustrated comprises a headlight which may be provided with the usual casing 1 and any suitable lens 2. A beam reflector 3 is mounted in the casing and preferably comprises a standard substantially parabolic reflector such as commonly used on automobiles. An electric bulb 4 is supported in the reflector with its light source substantially in the focal region in order to project the usual light beam. The bulb is preferably of the double filament type under the control of the driver, whereby either the usual so-called up or down beam may be projected. A parking bulb may be positioned in the usual standard opening 5 above the bulb or it may be positioned below the bulb. The bulb 4 may be supported in the usual socket and in a standard position for such bulbs.

Figure 16:
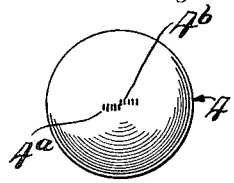
Fig. 16 is a diagrammatic front elevation of the usual double filament bulb and illustrates one arrangement of the double filaments which is adapted for use in the present invention.

In Fig. 16 is shown a diagrammatic front view of the usual type of double filament bulb 4 with filaments 4a and 4b, which are in the focal region in the usual prefocused position to position up and down beams in accordance with standard practice.

The invention may form an integral part of a standard headlight or may be provided in the form of an attachment which may easily be applied by the user.

The glare eliminating attachment, comprising one embodiment of this invention, may comprise a substantially ring-like annular or penannular member 7, which, for convenience in this application, may be termed a zone member. This member may be of any suitable material, although sheet metal is preferred, and may be provided with narrow out-turned marginal flanges 8, as shown in Fig. 4, whereby the rigidity of the member may be increased and whereby the attachment may snugly conform to the inner surface of the reflector. The ring-like zone member 7 may be provided with a light-absorbing surface, preferably black, although good results may be obtained by the use of a diffusing surface, the object being to make rays from the light source ineffective to produce strong filament images in space.

The zone member 7 may be open at the top, as shown in Fig. 2, to accommodate the parking bulb between the ends thereof, or it may be closed, as shown in Fig. 3, and provided with any suitable notch 9 to permit its insertion in the headlight without interfering with the usual parking bulb. The zone member is such that it fits in the reflector substantially in the focal plane and is of such contour and area as to most effectively cover the glare zone or such areas thereof as may be effectively prevent glare in predetermined portions of the illuminated field. In other words, all or such portions of the so-called glare zone may be made light absorbent or otherwise arranged to make the rays from the light source impinging thereon ineffective to project glare images. It has been found that, when the zone member is made substantially in the form shown in Figs. 1 and 2, glare is effectively eliminated and the beam controlled in a manner suitable for all practical purposes.

In order to provide means for further controlling the light pattern and for controlling the so-called fringe light and direct light from the bulb, a bulb cap 10 is supported on the zone member by suitable means such as a resilient spring clip 11. The bulb cap is preferably of sheet metal and may comprise a ring-like member conforming substantially to the peripheral outer edge or corner of the usual light bulb. This member is provided with a depending shield portion 12 which extends downwardly preferably somewhat below the axis of the bulb and is of a contour to effectively shield the direct rays from the filament from being projected outwardly and angularly upward. The opening in the cap below the depending shield portion is of such contour as to permit direct rays to be projected forwardly and downwardly in such portions of the illuminated field as are desirable for effective illumination while at the same time eliminating the useless rays. The depending portion 12 is formed with upwardly extending angular sides 13 and 14, whereby the opening on the side 14 is somewhat higher than the opening on the side 13. This provides a suitable spread and corresponding top cut-off of the direct rays from the filament. The actual top cut-off of the illumination on each side may be substantially the same height and, although the portions of the opening in the cap at 13 and 14 are at different heights, the filament position in the usual standard bulb relative to the cap opening, causes a horizontal top cut-off of the direct light.

The ring portion of the cap on the right-hand side, as shown in Fig. 2 at 15, is substantially wider than the left-hand side of the ring portion and tapers toward the bottom of the ring. This provides a slightly greater cut-off on the left-hand side of the beam from the driver's viewpoint and prevents disturbing aberration rays caused by reflective and refractive inaccuracies in the edges or peripheral front corner of the bulb, which would otherwise cause light streaks. In other words, the narrow ring portion of the cap, wider on one side than on the other, eliminates streaks in the light due to reflection and refraction at the front edge of the bulb. Such additional shielding is not required on the right-hand side of the beam from the driver's viewpoint for the reason that this portion directs light outwardly to the right-hand side of the road.

The cap is also provided at the top with a rearwardly extending, substantially arcuate shield portion 16, and this portion may conform substantially to the contour of the bulb. This shield portion 16 is preferably positioned slightly to one side of the vertical axial plane of the cap as shown and shields to a certain extent the upper portion of the reflector, and, together with the zone member, provides a so-called fringe cut-off which effectively eliminates light streaks and useless rays which otherwise would be directed upwardly and reflected rearwardly into the eyes of the driver from dust, fog, rain, and snow.

The top shield portion 16 is provided with a small arcuate rearwardly extending portion 17 which extends rearwardly beyond the main portion of the shield, and this is for correcting the top fringe cut-off for the up beam selectively more than for the down beam. This is desirable because the up beam is directed more in the oncoming driver's eyes than the down beam. This is due to the different positions of the up beam and down beam filaments. The bulb shield, in combination with the zone member, corrects the top fringe cut-off and side cut-off for the beam and provides a desirable light pattern without glare and rearwardly reflected light into the eyes of the driver.

The resilient clip 11 is preferably formed of spring wire, as shown particularly in Figs. 4 and 6, and preferably is positioned horizontally as shown with the outer ends of the clip formed laterally at 18 and secured to the zone member by any suitable means such as welding or sheet metal members 19 which are formed to engage the ends of the wire clip and may be secured to the zone member by spot welding or any other suitable means. The arms of the clip preferably are arcuate in a horizontal plane, as shown at 20, Fig. 4, and the intermediate portion of the clip is formed to provide an upwardly and forwardly extending loop 21 having its outer end substantially conforming to the contour of the cap and secured thereto by a securing member 22 which may be similar to the member 19 and secured to the cap in a similar manner. The intermediate portion of the clip is also formed to provide a resilient bulb engaging portion 23 which conforms substantially to the contour of the base of the bulb and is arranged to be clipped thereover as shown to retain the entire attachment in position with the zone member snugly engaging the reflector surface and the cap snugly engaging the bulb. The closely adjacent forwardly extending portions of the cap supporting loop 21 may be secured together adjacent the bulb engaging portion 23 by means of a sheet metal clip 24 in the manner illustrated in Fig. 5.

The zone member 7 is preferably of resilient material and, when it is open at the top as illustrated in Fig. 2, there is a certain amount of resiliency which, together with the resilience of the clip 11, enables the zone member and cap to be snugly seated and the zone member to conform to the contour at the glare zone of parabolic reflectors of various sizes within predetermined limits.

The inner surface of the zone member 7 may, if desired, be provided with a felt reflector contacting member 25, as shown in Fig. 4. This felt may be in the form of a strip conforming substantially to the contour of the zone member and may be secured thereto by a suitable adhesive or other means. It will be understood, of course, that the zone member may be a closed ring, if desired, such as shown in Fig. 3. However, the split ring is preferable when it is desired to use the same attachment for reflectors of slightly different sizes; also, small pads of felt-like material may be used if preferred.

Figure 11:
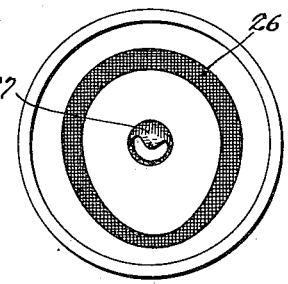
Fig. 11 is a front view of the reflector and bulb illustrated in Fig. 10 with the lens removed.

Figs. 10 and 11 illustrate a very important embodiment of the invention in which the glare eliminating and pattern correcting features form integral parts of the headlight and bulb. In this embodiment the reflector 3a may be provided with a substantially ring-like light-absorbing area or zone 26. This area may be provided in any suitable manner and may form a continuation of the inner surface of the reflector. However, it conforms in area and position substantially to the glare zone of the reflector, as previously described, and the area and limits of which may be determined by the same methods, which will be described in detail later. The bulb may also be provided with a substantially opaque or light-absorbing area 27 which may conform in all respects, in so far as contour and area is concerned, with the cap previously described. The light-absorbing or light-affecting characteristics may be provided in the glass itself or the bulb may suitably be coated on its inner or outer surface, or both.

Figure 12:
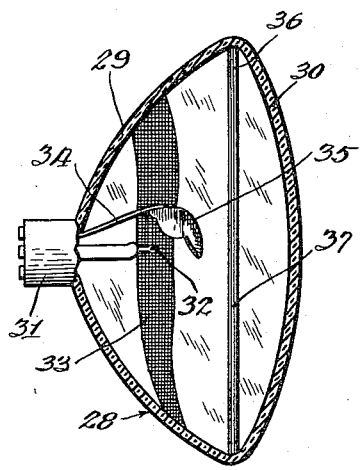
Fig. 12 is a vertical axial section through a combined bulb and reflector illustrating a further embodiment of the invention.

Fig. 12 illustrates an embodiment wherein the reflector and glare controlling and light controlling means is incorporated in the bulb structure itself and forms an integral part thereof. This embodiment comprises an enlarged evacuated or gas-filled bulb 28 having its rear portion 29 in the form of a beam reflector, preferably having a parabolic reflecting surface on the inside of the reflector wall. The entire bulb except the base is preferably of glass and the reflector surface is preferably the inner surface of the portion 29 to eliminate, as much as possible, refraction aberrations. The front wall 30 of the bulb may be of any suitable contour, preferably convex, as illustrated, and may be in the form of a lens similar to the ordinary automobile headlight lens, or, if desired, it may be of clear glass and a suitable casing may be provided for the combined reflector and bulb and the usual lens may be positioned in front of the bulb. In any event, the operation of the device and the general arrangement of the light controlling means is substantially the same as in the embodiments previously described.

The bulb may be provided with the usual base 31 supporting a light source 32 in the focal region of the reflector. A light-absorbing zone 33 of the same character as the zone 26 described in connection with Figs. 10 and 11 may be positioned in the same relationship to the light source. A support 34 of any suitable character, preferably wire, extends inwardly from the base 31, and a shield 35 is mounted on the support in a position to shield the light source in the same manner as the upper portion of the bulb shield previously described. The shield 35 may be of substantially the same contour as the upper portion of the cap 10. The narrow depending ring portion may also be used, if desired, but is preferably eliminated. In any event, the arrangement and function of the various elements are substantially the same as those used in connection with the previously described embodiments.

If desired, the light source may be enclosed in a suitable glass envelope, in which case the cap may be substantially identical with that previously described. In this embodiment the corners 36, where the front wall 30 joins the reflector portion 29, tend to cause reflective and refractive light aberrations due to the shape and the distortion of the walls at this point. A narrow light-absorbing band 37 is, therefore, provided either on the inside or outside of the wall of the bulb or within the glass, whereby light aberrations from this source are prevented.

It will be understood, of course, that the areas 33 and 37 for making light rays ineffective to produce glare may be provided in any suitable manner, such as proper treatment of the glass itself or a surface thereof, whereby the rays impinging thereon are made ineffective to produce glare.

Figure 13:
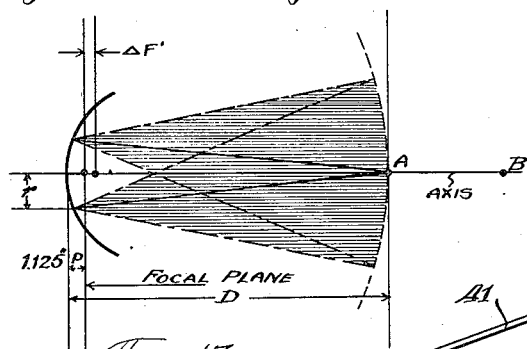
Fig. 13 is a diagrammatic illustration of a method for mathematically determining the glare zone for any given parabolic reflector.

It has been found that the present invention corrects for glare not only outside the substantially collimated main beam, but also within the main beam, and substantially eliminates all filament images in space, which are the direct cause of so-called glare. The area and location of the zone to accomplish this result may accurately be calculated. It is only necessary to determine the extremes on the axis of the reflector between which it is desired to correct for glare and a proper determination and treatment of the zone with relation to these two points will eliminate filament images or glare in the main beam as well as substantially over the entire illuminated area. The determination of the extreme limits of the zone may be accomplished by the following formula, as illustrated diagrammatically in Fig. 13.

$$\Delta F' = \frac{r^2(8P^2 + r^2)}{16P^2(D-P)}$$

To determine the radius of the zone for correction point A r = the radius of zone measured from the axis.
P = focal length of reflector.
D = axial focus of glare, which in practice is a predetermined correction point.
ΔF' = distance of light source filament points ahead of focal point of reflector.

With a given reflector the focal length is known, and ΔF' is one-half the diameter of the helical filament coil of a prefocused Mazda No. 2331-32-32 C. P. bulb, and this solution is for the so-called up beam with axial filament.

If it is desired to correct for glare at fifteen feet, which is assumed to be the nearest point on the beam at which correction of glare would be desired or even useful, then D equals fifteen feet or 180 inches. For a so-called Riteway reflector with a No. 2331 bulb, P equals 1.125 inches, ΔF' equals .024 inch, $r$ is to be determined. Substituting in the general formula gives $$.024 = \frac{r^3(10.128 + r^3)}{20.256(180 - 1.125)}$$

Therefore, $r$ equals 2.375 inches.

Now, if the solution for the extreme point B on the axis is obtained in the same manner and the area between the two zone diameters be made light absorbing or otherwise arranged to make rays from the light source ineffective to produce filament images, it will be found that glare is substantially eliminated from the entire illuminated field. Since the actual standard filament extends considerably off the axis, the glare correction extends similarly off the axis but on the opposite side relative to any filament point of reference, as in dotted lines on the sketch.

It will be apparent that it is within the power of the designer accurately to control the extent of correction so as to provide greater corrections at certain angles of view than at others and that the best zone for a particular reflector need not necessarily be uniform in width all around the reflector.

Figure 14:
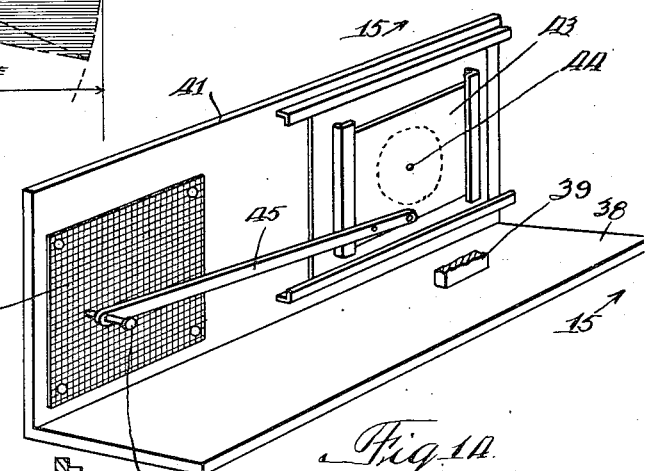
Fig. 14 is a perspective view illustrating a so-called glarograph by which the location and limits of any glare zone may accurately be determined and plotted.
Figure 15:
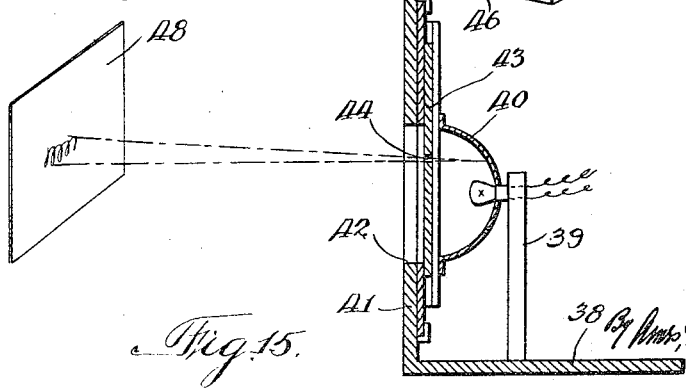
Fig. 15 is a sectional view through the glarograph illustrated in Fig. 14 and is taken on a line substantially corresponding to line 15—15 of Fig. 14.

A practical means for determining the limits of the glare zone is illustrated in Figs. 14 and 15. By this means any glare zone on any reflecting surface such as a parabolic reflector may be determined and plotted. The testing device comprises a base 38, on which is mounted a support 39 for a reflector 40 which is to be tested. The support may be adjustable and arranged to support any desired reflector and light source therein substantially in the position shown in Fig. 15. In front of the reflector is a shield 41 having an opening 42 therein somewhat larger than the reflector to be tested.

A scanning disc 43 covers the opening 42 and is mounted for horizontal and vertical movement in suitable slides as illustrated, and the disc is provided with a small opening 44 for scanning purposes. By this arrangement the entire front of the reflector may be scanned by the perforation both horizontally and vertically. The opening 44 may be provided with a small lens, if desired, to sharpen the filament image which will be projected therethrough. However, the lens is not essential. An arm 45 is secured to the scanning disc and provided at its outer end with a pencil or other marking device 46 whereby pressure may be applied to the pencil to indicate the limits of any glare zone on a sheet of graph paper 47, which paper may be supported on the shield 41, as shown in Fig. 14.

With a proper arrangement of the testing device and a suitable size opening 44, a single filament image will brilliantly be projected on a screen 48 positioned in front of a testing device. Filament images are projected only when the scanning opening passes over an area corresponding to the previously defined glare zone, and there will be no images projected from other areas of the reflector unless the reflecting surface is distorted. The testing device may be made accurately to register on the chart 47, the boundary lines of the glare zone and also the boundary lines of any distorted areas on the reflector. The device, therefore, provides a simple and efficient means for testing all types of reflectors to accurately define the boundary lines of any glare zone or zones forming glare images, as well as testing the structural accuracy of the parabolic reflector itself.

The same arrangement of zone area and cap area may be provided for both headlights. The usual bulb is provided with a "down beam" filament and an "up beam" filament, and the controlling areas on bulb and reflector are designed to effectively correct both beams. The down beam is particularly effective in fog, dust, or storms, as it is directed to give somewhat more illumination on the right shoulder of the highway, and the correction is such that there is no stray top lighting which otherwise forms intense streaks and illuminates rain, fog, and dust particles and greatly reduces visibility.

While a single filament bulb may be used, the embodiments shown are particularly adapted for use in combination with a double filament bulb. In actual practice the left wing of the zone 7 (as seen in Fig. 2) may be slightly wider than the right wing. This, together with the contour of the cap zone, causes satisfactory operation with both down beam and up beam, and the narrow wing covers sufficient area in either case.

The embodiments herein disclosed are particularly adapted for the usual right hand driving. However, wherever it is customary to drive on the left hand side of the highways, the configuration of the zones on the reflector and on the bulb may be reversed to provide the desired light pattern.

The zone of the present invention provides an effective light intercepting means which is so related to the light source and reflector that high peak intensity in the beam pattern is substantially eliminated to thereby provide more nearly uniform illumination and improve seeing for the user.

Modifications may be made without departing from the spirit of the invention, and it is desired, therefore, that the invention be limited only by the prior art and the scope of the appended claims.

Having thus described this invention, what is claimed and desired to be secured by Letters Patent is:

1. An automobile headlight comprising a generally focalizing substantially parabolic reflector having a focal region, a light source substantially in the focal region, said reflector having a comparatively narrow ring-like substantially concentric light absorbing zone substantially in the focal plane, said zone conforming substantially to the normal surface of said reflector.

2. In an automobile headlight the combination with a generally focalizing substantially parabolic reflector having a focal region with an electric bulb supporting a light source substantially in the focal region, and having a comparatively narrow ring-like substantially concentric light absorbing zone substantially in the focal plane and conforming substantially to the normal surface of said reflector, of means closely adjacent said bulb for intercepting a material portion of the forward direct rays and substantially all of the upward angular direct rays.

3. A vehicle lamp comprising a generally focalizing substantially parabolic reflector having a focal region, a light source substantially in the focal region, and a substantially ring-like light absorbing zone snugly adjacent the normal reflector surface and substantially in the focal plane of said reflector, the width of said zone being materially greater on one side of the axis of said reflector than on the other side.

4. A vehicle lamp comprising a generally focalizing substantially parabolic reflector having a focal region, a light source substantially in the focal region, and a substantially penannular light absorbing zone snugly adjacent the normal reflector surface and substantially in the focal plane of said reflector, the width of said zone gradually tapering from one side toward the other side of said reflector.

5. In a vehicle lamp comprising a generally focalizing substantially parabolic reflector having a focal region, a light source substantially in the focal region, the combination with a substantially ring-like light absorbing zone around said light source and snugly adjacent the reflector surface and substantially in the focal plane of said reflector, the area of said zone being materially greater on one side of said axis than on the other side, of means to intercept a material portion of the forward direct rays from said light source.

6. A vehicle lamp comprising a generally focalizing substantially parabolic reflector having a focal region, a light source substantially in the focal region, said reflector having a substantially ring-like light absorbing zone substantially in the focal plane and forming substantially a continuation of the reflector surface, the area of said zone being materially greater above the axis than below the axis, and means to intercept a material portion of the forward direct rays from said light source, said means being arranged to intercept angularly upward direct rays not intercepted by said reflector.

7. An attachment for a vehicle lamp having a substantially parabolic reflector with a focal region and a light source substantially in the focal region, said attachment comprising a comparatively narrow substantially ring-like member forming a light absorbing zone substantially conforming to said reflector surface substantially in the focal plane, and means for retaining said member snugly against said reflector surface.

8. An attachment for a vehicle lamp having a substantially parabolic reflector with a focal region and an electric bulb in said reflector with a light source substantially in the focal region, said attachment comprising a comparatively narrow substantially ring-like member forming a light absorbing zone substantially conforming to said reflector surface substantially in the focal plane, a substantially opaque cap for snugly covering at least a part of the front of said bulb, and means for resiliently securing said attachment in said reflector.

9. In an automobile headlight having a substantially parabolic reflector with a focal region and a bulb with a light source substantially in the focal region, an anti-glare attachment comprising a comparatively narrow ring-like member forming a light absorbing zone substantially conforming to said reflector substantially in the focal plane, resilient means on said member and arranged to engage said bulb whereby said attachment is held snugly in said reflector, and a bulb cap forming a part of said attachment and positioned to intercept a material portion of the forward and angular direct rays from said bulb.

10. An attachment for a vehicle lamp having a substantially parabolic reflector with a light source substantially in the focal region, said attachment comprising a substantially split-ring-like resilient sheet metal member forming a light absorbing zone substantially conforming to said reflector surface substantially in the focal plane and resilient means for retaining said member snugly against the reflector surface, the resilience of said members enabling said attachment to be positioned in reflectors of different dimensions within small limits with the light absorbing zone in substantially the same relationship to the focal plane.

11. In an automobile headlight, the combination with an enlarged sealed vitreous envelope having a substantially parabolic generally focusing beam reflector rear portion, a front lens portion, and a light source substantially in the focal region, of glare preventing means in a narrow substantially annular zone substantially in the focal plane and forming substantially a continuation of the reflecting surface, and means within said bulb and adjacent said light source to intercept substantially all angular forwardly and upwardly directed rays from said light source which otherwise might be reflected back into the driver's eyes from fog, dust, and the like, from between the driver and the top cut-off of the main beam, the width of said zone being limited to the area in or closely adjacent said focal plane from which the more intense real images of said sources are normally projected.

12. A beam projecting bulb comprising a sealed envelope having a substantially parabolic generally focusing beam reflector rear portion and a lens front portion, a light source substantially in the focal region, glare preventing means in a narrow substantially annular zone substantially in the focal plane and forming substantially a continuation of the reflecting surface, said means comprising a surface having light absorbing characteristics capable of preventing reflected rays therefrom from projecting filament images from said zone into the range of vision of observers in an approaching automobile, means in said bulb adjacent said light source to intercept substantially all angularly upward direct rays from said light source which otherwise might be reflected back into the driver's eyes from fog, dust, and the like, between the driver and the top cut-off of the main beam, and a narrow light-absorbing annular band substantially at the inner intersection of said reflector portion and said lens portion whereby disturbing light reflection and refraction is eliminated therefrom.

13. The combination with an automobile bulb comprising a deep dished rear portion and a shallow dished convex front portion joined together at their largest diameters to form a short radius connecting portion at the maximum diameter of said bulb, of a hood on the front end of said bulb comprising a narrow annular portion covering substantially only the said short radius connecting portion, and a depending shield portion covering the upper front of said bulb, the lower margin of said shield portion being substantially V-shaped with the apex below the axis of said bulb and the arms extending angularly upward therefrom to intersect said narrow annular portion.

14. The combination with an automobile bulb comprising a deep dished rear portion and a shallow dished convex front portion joined together at their largest diameters to form a short radius connecting portion at the maximum diameter of said bulb, of a hood on the front end of said bulb comprising a narrow annular portion covering substantially only the said short radius connecting portion, and a depending shield portion covering the upper front of said bulb, the lower margin of said shield portion being substantially V-shaped with the apex below the axis of said bulb and the arms extending angularly upward therefrom to intersect said narrow annular portion, one of said marginal V-arms extending materially higher than the other to provide an unsymmetrical opening below said shield portion.

15. In a beam projecting lamp, the combination with a substantially parabolic reflector having a light bulb therein with a light source substantially in the focal region of said reflector of a light-absorbing shield on said bulb, said bulb comprising a deep dished rear portion and a shallow dished convex front portion joined at their maximum diameters to form a peripheral rounded corner, said shield comprising a ring-like area covering said peripheral rounded corner of said bulb, a material portion of said ring-like area being restricted to immediate the periphery, and an area depending from the top of said bulb and terminating adjacent the axis, the lower contour of said depending area flaring outwardly and upwardly from adjacent said axis to intersect said ring-like area.

16. The combination with a sealed electric light bulb comprising a generally focalizing substantially parabolic reflector rear portion having a focal region and a light source substantially in the focal region, and a front lens portion, of a comparatively narrow substantially concentric light-absorbing zone substantially in the focal plane.

17. The combination with a sealed electric light bulb comprising a generally focalizing substantially parabolic reflector portion having a focal region and a light source substantially in the focal region, of a comparatively narrow substantially concentric light-absorbing zone substantially in the focal plane, and means within said bulb to intercept substantially all angular upwardly and forwardly directed rays from said light source.

ORVILLE STAM.